United States Patent
Sevat et al.

(10) Patent No.: US 7,428,014 B2
(45) Date of Patent: Sep. 23, 2008

(54) DEVICE FOR PARALLEL DATA PROCESSING AS WELL AS A CAMERA SYSTEM COMPRISING SUCH A DEVICE

(75) Inventors: Leonardus Hendricus Maria Sevat, Eindhoven (NL); Richard Petrus Kleihorst, Eindhoven (NL); Andre Krijn Nieuwland, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 549 days.

(21) Appl. No.: 10/534,476

(22) PCT Filed: Nov. 6, 2003

(86) PCT No.: PCT/IB03/50018

§ 371 (c)(1),
(2), (4) Date: May 10, 2005

(87) PCT Pub. No.: WO2004/044766

PCT Pub. Date: May 27, 2004

(65) Prior Publication Data

US 2006/0058984 A1 Mar. 16, 2006

(30) Foreign Application Priority Data

Nov. 14, 2002 (EP) .................................. 02079801

(51) Int. Cl.
*H04N 3/14* (2006.01)
(52) U.S. Cl. .................................... 348/272; 348/222.1
(58) Field of Classification Search ................. 348/272, 348/274, 275, 222.1; 345/505
See application file for complete search history.

(56) References Cited

U.S. PATENT DOCUMENTS 4,908,751 A 3/1990 Smith (Continued)

FOREIGN PATENT DOCUMENTS

WO 0131418 A2 5/2001

OTHER PUBLICATIONS

PHNL010306EPP, May 10, 2001.

(Continued)

*Primary Examiner*—Tuan V Ho
*Assistant Examiner*—Amy Hsu

(57) ABSTRACT

The invention relates to a device for parallel data processing, a DSP. The device according to the invention comprises a processor matrix (100) in which processors (103) are arranged in rows (101) and columns (102). Furthermore, the device (100) comprises first and second external data ports (107, 108). The rows (101) arranged in a stepwise manner and the columns are arranged in a stepwise manner. The processors (103) have a first processor data port (104), which is connected with one of the first external data ports (107) by means of first essentially straight connection. The processors (103) further comprise a second processor data port (105), which is connected with one of the second external data ports (108) by means of an essentially straight second connection (110). The first connection (107) and the second connection (108) are oriented substantially orthogonal to each other. A problem associated with conventional DSPs is that the connections to and from the processors within the DSP take up large amounts of silicon area. By arranging both rows and columns of the DSP according to the invention in a stepwise manner the connections may be essentially straight, thus minimizing their lengths and thus the surface area occupied.

12 Claims, 7 Drawing Sheets

U.S. PATENT DOCUMENTS

Figure 1:
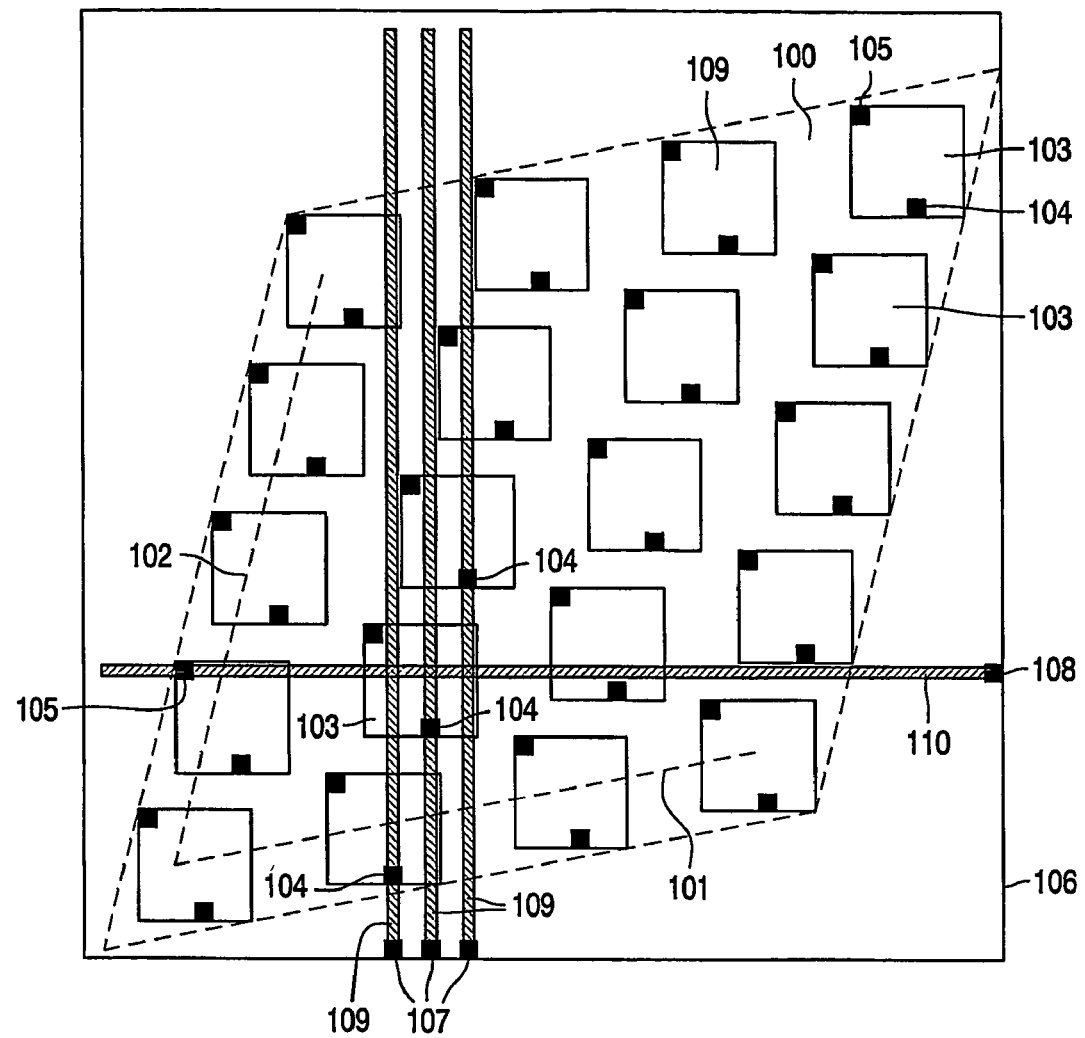

| | | |
|---|---|---|
| 5,745,171 A | 4/1998 | Ogawa et al. |
| 5,752,068 A | 5/1998 | Gilbert et al. |
| 6,038,682 A * | 3/2000 | Norman ................. 714/10 |
| 6,597,362 B1 * | 7/2003 | Norman ................. 345/505 |
| 6,636,986 B2 * | 10/2003 | Norman ................. 714/10 |
| 6,931,518 B1 * | 8/2005 | Redford ................. 712/234 |

OTHER PUBLICATIONS

Carlo H. Sequin, : Doubly Twisted Torus Networks for ViSI Processor Arrays, IEEE May 1981, pp. 471-480,XP000745285.

* cited by examiner

DEVICE FOR PARALLEL DATA PROCESSING AS WELL AS A CAMERA SYSTEM COMPRISING SUCH A DEVICE

The invention relates to a device for parallel data processing.

The invention also relates to a camera system comprising such a device for parallel data processing.

Parallel data processing devices are generally known. Such devices are also generally known to be arranged as integrated circuits. They are known as Digital Signal Processors (DSPs). A field of application of DSPs is the processing and manipulating of image data obtained by means of solid-state image sensors.

In such applications the DSP is included in a camera system comprising optics for projecting light images on a solid-state image sensor which converts the light images into analog electrical signals, a converter for converting the analog electrical signals into image data in digital form and said DSP for further data processing among which, for example, quality improvement of images generated by means of these data on for example monitors. Quality improvement may comprise for example the suppression of noise such as fixed pattern noise, contrast enhancement or overexposure compensation.

Camera systems as described above are applied for example in CCTV (Closed-Circuit Television) systems, webcams, mobile telephones, video conference systems and DSCs (Digital Still Cameras), but also in professional recording systems as are used for example in television studios.

Solid-state image sensors indicated above mainly comprise a sensor matrix built-up from rows (image lines) and columns of light-sensitive elements. In this structure incident light images are split up into picture elements or pixels. The light-sensitive elements convert the light images pixel by pixel into an electric signal (pixel signal). The aggregate pixel signals thus contain information of a complete light image. For further processing, the pixel signals are converted into digital data. The aggregate data thus contain the information of a complete light image but in digital form now.

Solid-state image sensors are customarily produced in Charge Coupled Device (CCD) IC technology or a Complementary Metal Oxide Semiconductor (CMOS) IC technology. In both cases the pixel signals are formed by electrical charge packets. For color information sensing, the individual light-sensitive elements in the sensor matrix are provided with for example red, green and blue color filters in an alternating pattern. As a result of the use of a color filter, each light-sensitive element is sensitive to only one color. Besides the applications mentioned above, a DSP can be used in such for calculating color values for the lacking colors by means of an interpolation method based on the data generated by adjacent light-sensitive elements.

In a customary reading fashion pixel signals coming from the light-sensitive elements are converted into data row by row (or image line by image line) in the sensor matrix. It is customary for this data to be intermediately saved in a line memory prior to further processing. Such a line memory or data buffer has room for the data coming from at least one image line.

Before the image data is converted into a format that is suitable for display, it is generally necessary for the image data to be processed, for example by combining the color information from different pixels. In the device which is necessary for this purpose the associated data per pixel is used as well as data of surrounding pixels in the sensor matrix. Identical processes are then carried out with data coming from ever-different pixels. It is thus obvious for these identical processes to be carried out in parallel for different pixels and for these identical processes to be carried out by means of a device for parallel data processing, for example a DSP. It is a generally recognized advantage that DSPs require less time for processing the same amount and dissipate less electrical power than other data processors.

The DSP comprises a plurality of processors and a memory or data buffer for temporary storage of data still to be processed or for temporary storage of data already processed or for both. The processors of the DSP and the data buffers have data ports for input and output of the data.

A considerable problem with the designing of the DSP is the positioning the processors relative to each other and relative to the data buffer in an integrated circuit. The mutual positioning has a great influence on the routing of the connections between the data ports of different processors and the connections between data ports of processors and data ports of data buffers. The parallelism in data processing requires many connections. Consequently, these connections largely determine the surface area necessary for the integrated circuit on the silicon.

It is an object of the invention to provide a device for parallel data processing, the processors being positioned relative to each other and to the data buffer in a manner that results in a minimum surface area.

Said object is achieved by a parallel data processing device having at least one matrix of processors arranging in rows and columns, first additional data ports located outside the matrix and second additional data ports located outside the matrix, wherein (i) the rows are arranged in a stepwise fashion relative to one another, (ii) the columns are arranged in a stepwise fashion relative to one another, (iii) processors have a first processor data port which is connected with one of the first external data ports by means of a first at least straight connection, and (iv) processers have a second processor data port which is connected with one of the second external data ports by means of a second at least essentially straight connection, wherein the second at least essentially straight connection is oriented at least essentially orthogonal to the first at least essentially straight connection.

An essentially straight connection is understood to be meant as a connection that is straight and may have minor bends or curves.

The stepwise mutual arranging of the rows and columns in the processor matrix implies that each row or column of the processors is shifted in the direction of the rows or columns respectively relative to the previous row or column respectively. The shift for each row or column is then in the same direction.

By arranging the processors in such manner, there may be made essentially straight connections between each of the first processor data ports and the corresponding first further data port and between each of the second processor data ports and the corresponding second further data port. An essentially straight connection is the shortest possible connection that also takes up minimum surface area. This achieves a considerable saving on the required surface area.

A further advantage of the device according to the invention is that connections, except for essentially straight connections, are placed as close together as possible, so that a further saving on required surface area is achieved.

In lieu of opting for an integrated circuit having a smaller surface area there may also be opted for increasing the functionality of the device, for example, by more functionality of larger individual processors. This offers possibilities of implementing more advanced image processing algorithms on the same surface area.

The device also lends itself to application on printed circuit boards PCBs in which the processors are mounted as separate integrated circuits on a PCB and the connections are formed by the metal tracks on the PCB.

International patent application IB 02/01559 describes a device for parallel data processing and a camera system comprising such a device. The camera system comprises a sensor matrix, a data converter and a device for parallel data processing, a DSP. This DSP comprises a matrix of processors arranged in rows and columns and a series of first external data ports located outside the processor matrix. The rows of the matrix are arranged in a stepwise fashion relative to each other. Further, processors in the matrix have a first processor data port which is connected with one of the first external data ports by means of a first at least essentially straight connection. A disadvantage of this DSP is that the columns of the matrix are not arranged in a stepwise fashion relative to each other. As a result it is impossible in the event a second processor data port is present on processors in the matrix and second external data ports to interconnect them by means of a second at least essentially straight connection which is at least essentially perpendicularly oriented on the first connection.

An embodiment of the device according to the invention is characterized in that the device comprises a first data buffer for data storage, which data buffer has first buffer data ports of which at least one is connected with one of the first external data ports by means of an at least essentially straight third connection which is a continuation of the first connection. An advantage of this embodiment is that also by making the connections between the first external data ports of the processors and the first buffer data ports of the first data buffer essentially straight, a further saving on required surface area is achieved.

A further embodiment of the device according to the invention is characterized in that the first data buffer is split up into two physically separated parts, a first part of which is positioned near the first row of processors in the processor matrix and a second part of which is positioned near the last row of processors in the processor matrix. An advantage of this embodiment is that a further minimization of the surface area necessary for the connections is obtained.

A further embodiment of the device according to the invention is characterized in that the device comprises a second data buffer for data storage, which has two buffer data ports at least one of which is connected with one of the second external data ports by means of a fourth at least essentially straight connection that is a continuation of the second connection. An advantage of this embodiment is that also by making the connections between the second external data ports of the processors and the second buffer data ports of the second data buffer essentially straight, a further saving on required surface area is achieved.

A further embodiment of the device according to the invention is characterized in that the second buffer is split up into two physically separated parts a first part of which is positioned near the first column of processors in the processor matrix and a second part of which is positioned near the last column of processors in the processor matrix. An advantage of this embodiment is that a further minimization of the surface area necessary for the connections is obtained.

A further embodiment of the device according to the invention is characterized in that processors have a first primary processor data port and a first secondary processor data port, the first primary processor data port being formed by the first processor data port and the first primary processor data port of at least one of the processors being connected with the first secondary processor data port of another processor via the first connection. An advantage of this embodiment is that when at least one of the processors is supplied through the secondary processor data port with the same data as another processor, only one connection through the primary processor data port is necessary to connect a plurality of processor data ports with each other and with at least one of the first external data ports.

A further embodiment of the device according to the invention is characterized in that processors have a second secondary processor data port, the primary processor data port being connected for receiving and processing a data element from a series of data elements from one of the first external data ports and is connected with the second secondary processor data port of the processor that processes the element preceding the data element in the series of data elements and is also connected with the first secondary processor data port of the processor that processes the element succeeding the data element in the series of data elements. This embodiment is highly suitable for processing data from one image line in which a processor, in addition to the data of one pixel, which data enters through the first primary processor data port also needs data of adjacent pixels in the image line, the data of which enters through the first and the second secondary processor data ports, respectively. One and the same connection is used for this purpose to supply data both to the first primary processor data port of a processor and to the first and second secondary processor data port respectively on two other processors. An advantage of sharing connections in this way is that a further minimization of the surface area for the connections is obtained.

A further embodiment of the device according to the invention is characterized in that processors have a second primary processor data port and a third secondary processor data port, the second primary processor data port being formed by the second processor data port and the second primary processor data port of at least one of the processors being connected with the third secondary processor data port of another processor via the second connection. An advantage of this embodiment is also that data can be supplied to the processors column by column or can be read from the processors, one connection being shared by a plurality of processor data ports, so that the required number of connections is minimized. This achieves a further saving on required space.

A camera system according to the invention comprises a sensor matrix built up from rows and columns for converting incident electromagnetic radiation into pixel signals, means for converting pixel signals into data and a parallel data processing device according to the invention.

An advantage of the camera system according to the invention is that as a result of the relatively small surface area that is required for producing the device for parallel image data processing, the whole camera system can be produced as a single integrated circuit. It may nevertheless comprise powerful functions for processing recorded image data or improving the quality of the image data in one integrated circuit. This has made for example real time video and implementation of advanced computer vision algorithms possible. Such functions can be realized at lower cost with this. In its turn this makes products for the consumer market possible having for example video conferencing functionality or autonomous scene interpretation.

In an embodiment of the camera system according to the invention the sensor matrix comprises a color filter array in which each processor is arranged for processing data from a plurality of columns of the sensor matrix which data contains color information of different colors of the color filter matrix. Each light sensitive element of the sensor matrix comprises a color filter for example one of the colors red, green or blue. As a result, each light sensitive element becomes sensitive to one of said colors. Each processor is arranged for processing data from various columns of the sensor matrix, which contains color information of different colors of the set comprising red, green and blue. An advantage of this is that the color information is sensed without each pixel separately sensing all three color components red, green or blue. The parallel data processing device calculates the lacking color information per pixel.

Figure 2:
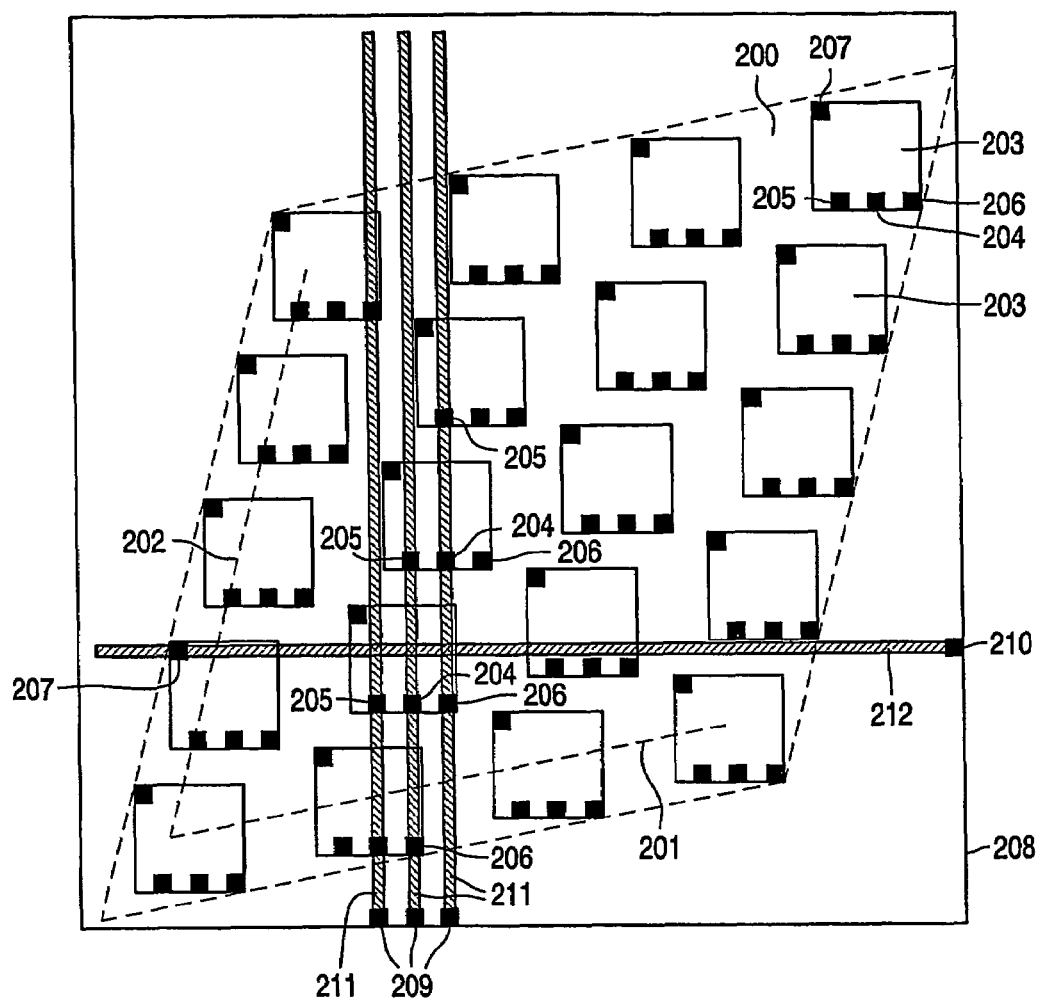
Figure 3:
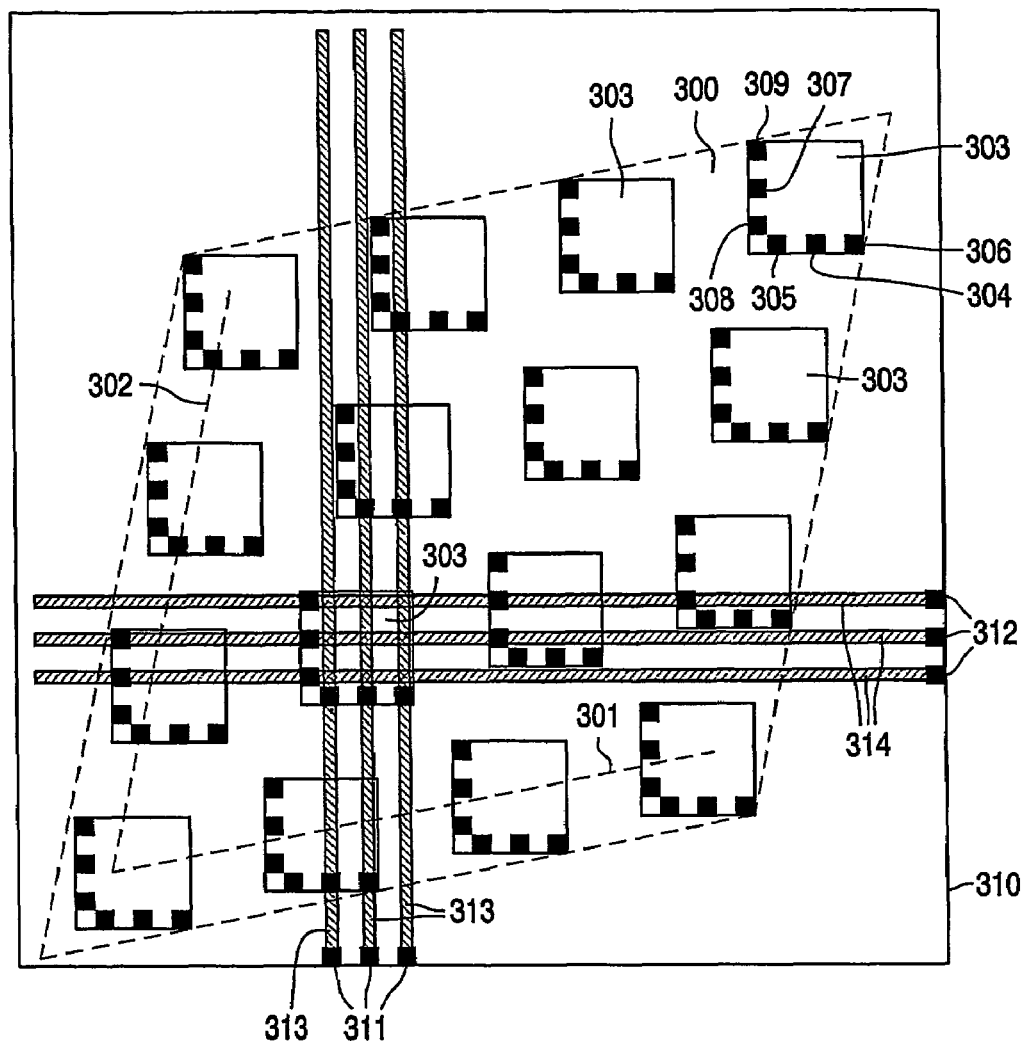
Figure 4:
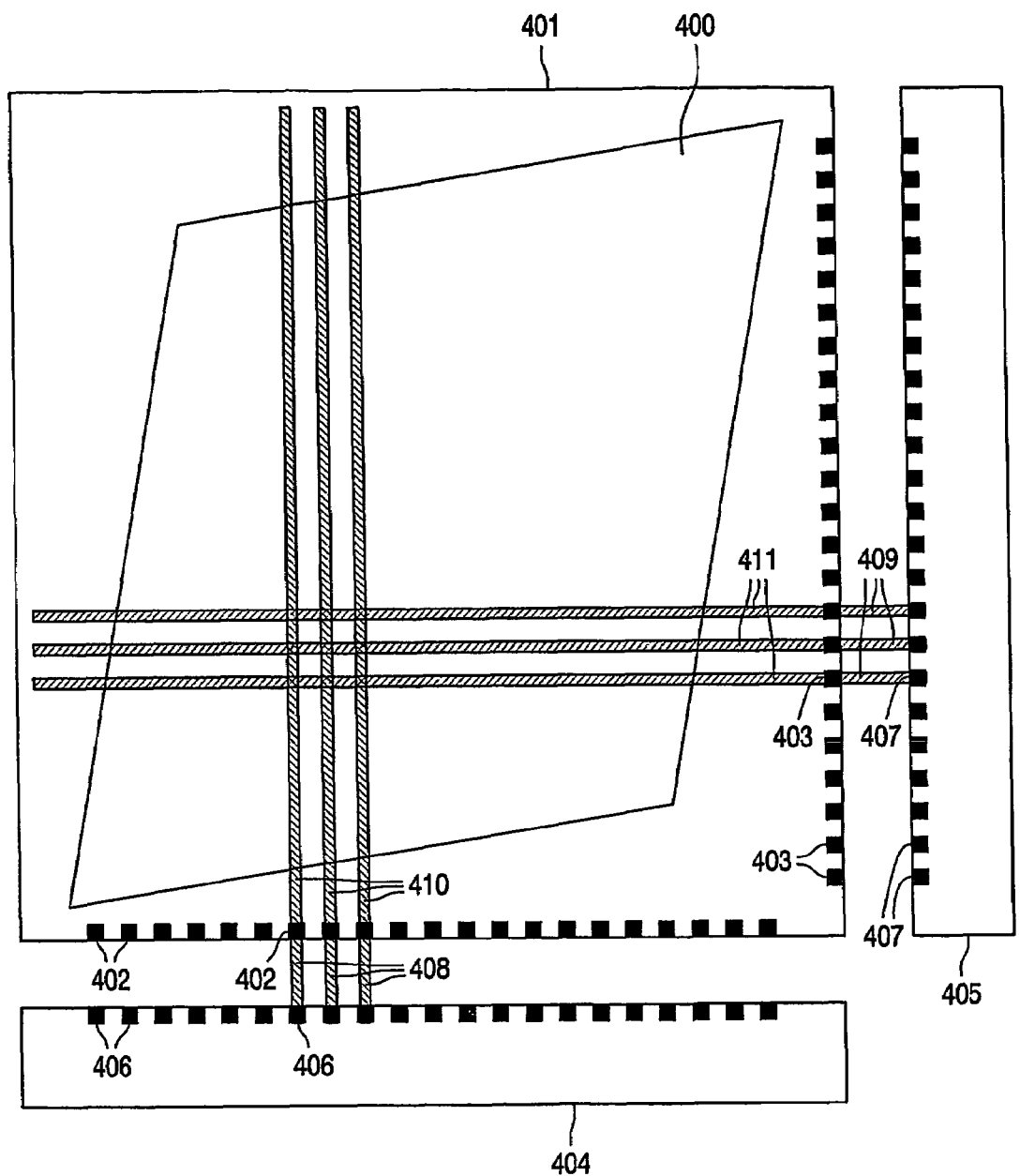
Figure 5:
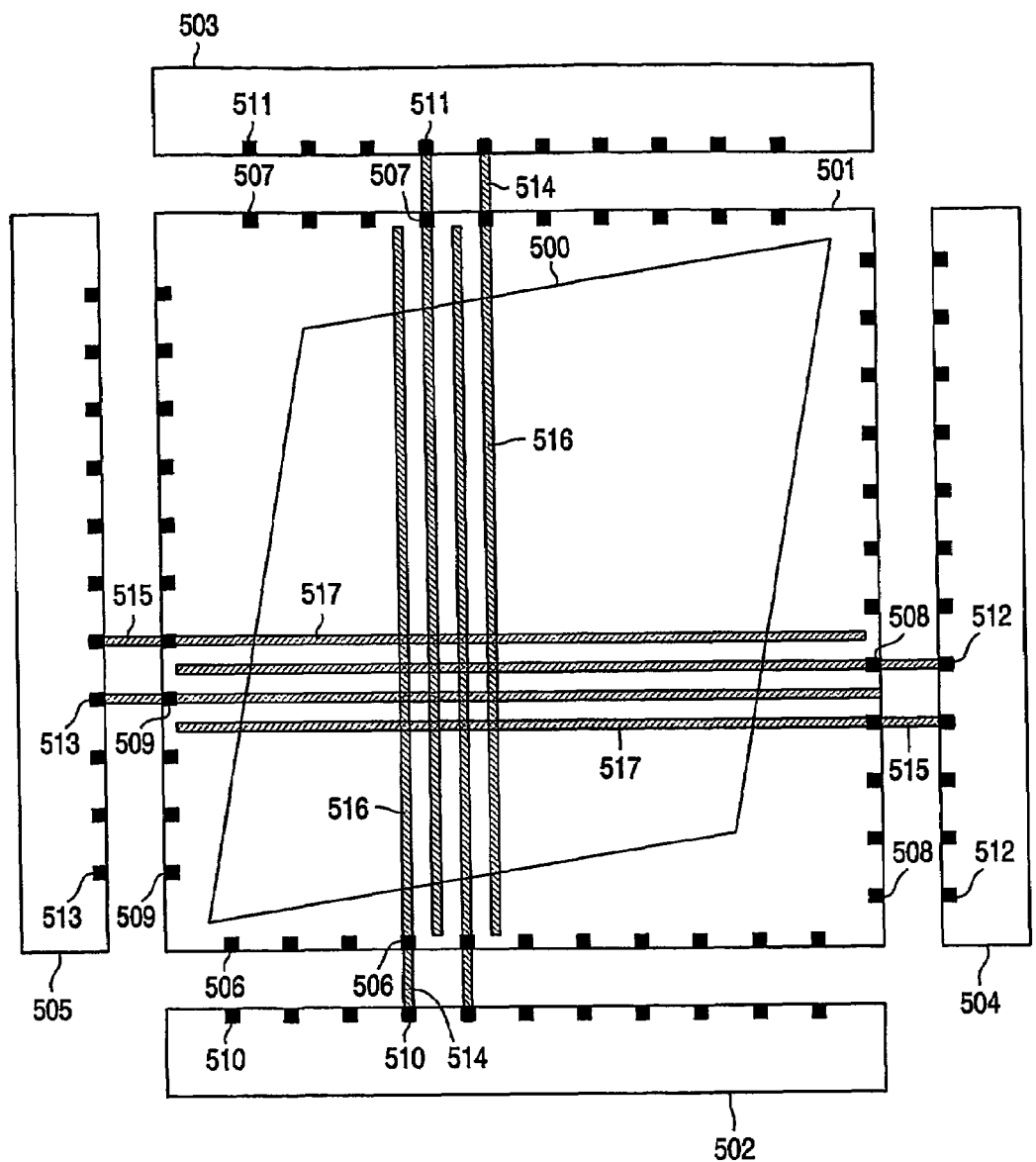
Figure 6:
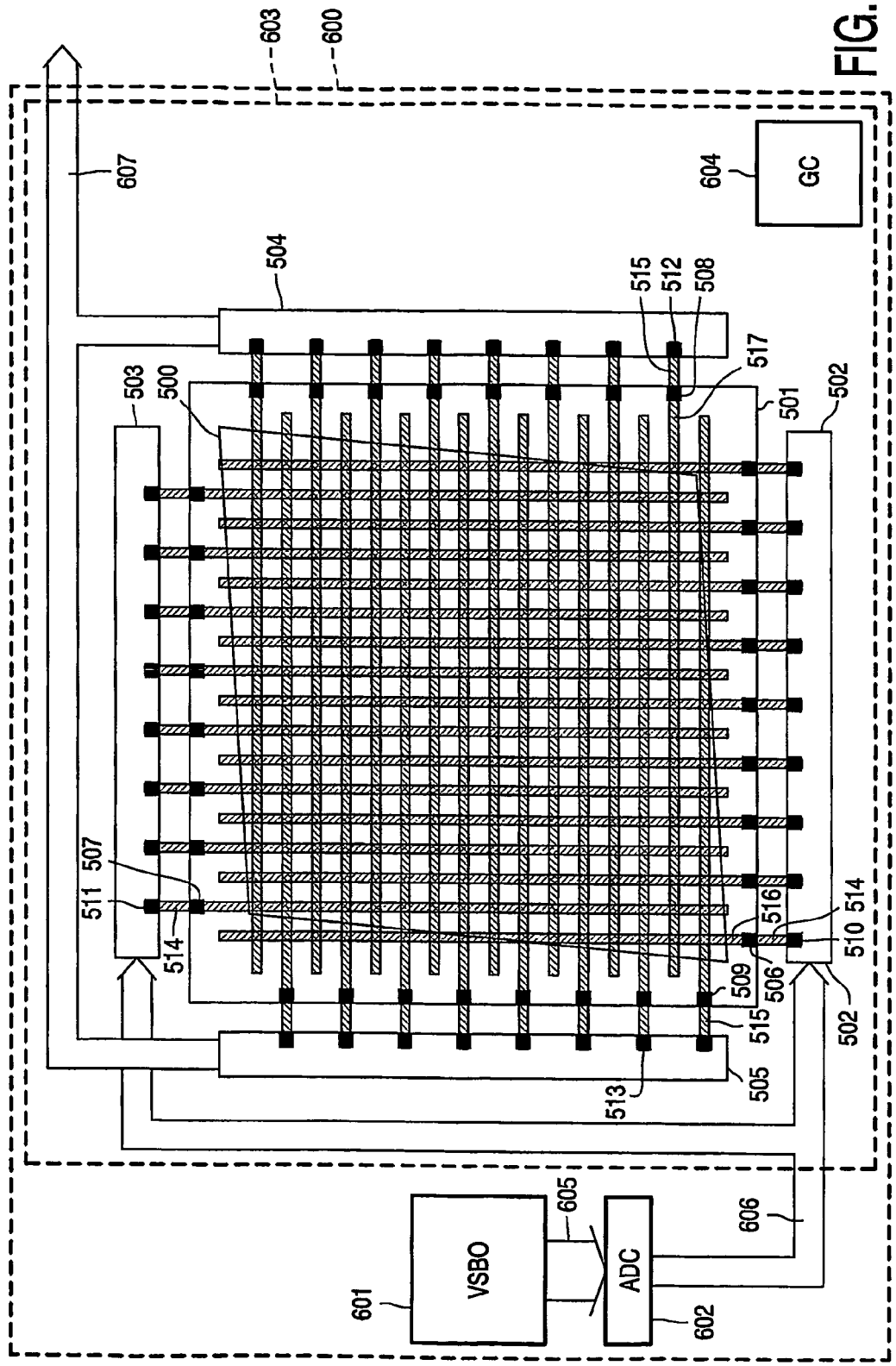
Figure 7:
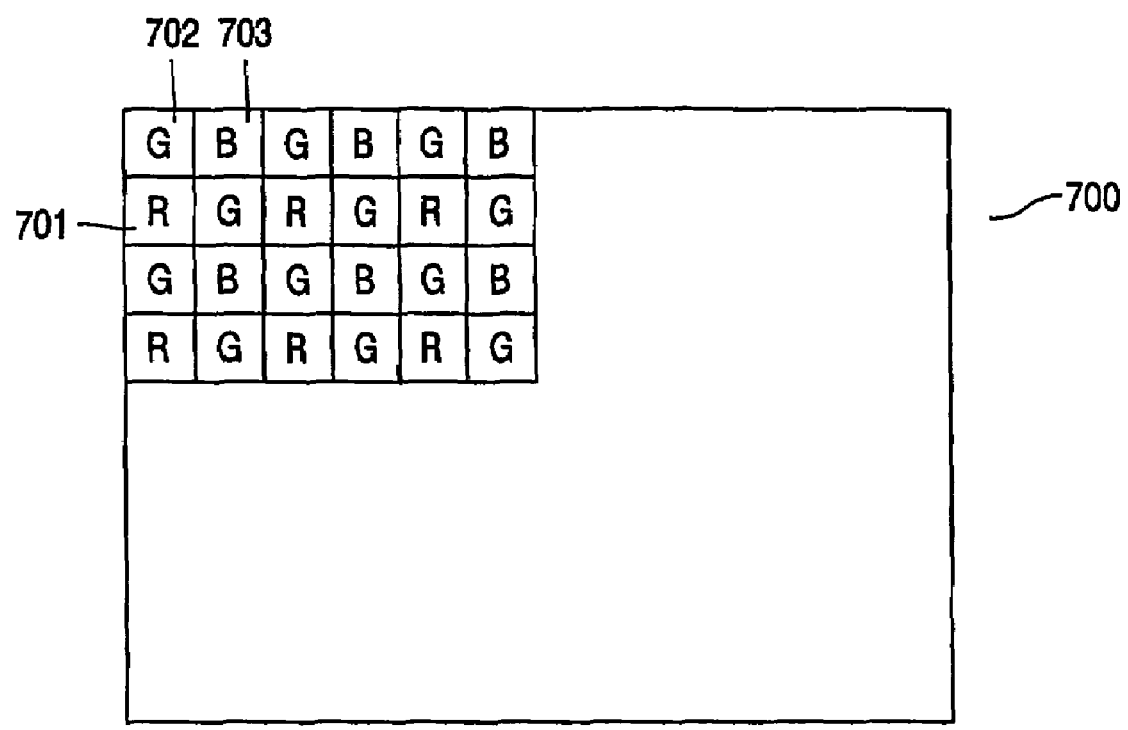

The invention will now be further described with reference to an example of embodiment and the drawing in which:

FIG. 1 shows in a diagram an embodiment of a matrix of processors of a device according to the invention, FIG. 2 shows in a diagram a further embodiment of the matrix of processors of a device according to the invention, FIG. 3 shows in a diagram a further embodiment of the matrix of processors of a device according to the invention, FIG. 4 shows in a diagram the positioning of buffers in an embodiment of the device according to the invention, FIG. 5 shows in a diagram the positioning of buffers in a further embodiment of the invention, FIG. 6 shows in a diagram an embodiment of a camera system according to the invention, and FIG. 7 shows in a diagram a color film matrix for use in an embodiment of a camera system according to the invention.

In these Figures like component parts are denoted by like reference characters.

FIG. 1 gives a diagrammatic representation of an embodiment of a matrix of processors 100 of a device for parallel data processing, a DSP, according to the invention. In the processor matrix 100 the processors 103 are arranged in rows 101 and columns 102. The rows 101 are mutually arranged in a stepwise fashion. This means that each row 101 is shifted in the same direction and preferably over the same distance relative to the previous row 101. Also the columns 102 are mutually arranged in a stepwise fashion. Each column 102 is thus shifted in the same direction and over the same distance relative to a previous column 102. The processors 103 have a first processor data port 104 and a second processor data port 105. Further, first external data ports 107 and second external data ports 108 are present in the periphery represented by the rectangle 106. The external data ports are located outside the processor matrix 100. The external data ports are connection points or terminals for electroconductive connections by which the processors 103 are connected with other electronic components which either form part of the DSP, or are located outside the DSP. The first processor data port 104 of a processor 103 is connected with a first external data port 107 by means of a straight connection 109. The second processor data port 105 is connected with a second external data port by means of a second straight connection 110. The second connection 110 is then situated transversely to the first connection 109. It is possible to have the first connection 109 and the second connection 110 straight because the processors 103 are arranged stepwise in staggered fashion both in the row direction and in the column direction.

Designing integrated circuits is done at different levels. A possible subdivision comprises the functional level and the layout level. At functional level the individual parts of an integrated circuit are subdivided into functional blocks among which, in the case of the DSP shown, the processors 103 and their mutual relations. At layout level the various functional blocks, processed in library cells, are then positioned and interconnected by connections.

A connection, such as the first connection 109 shown in FIG. 1 and the second connection 110, comprises at least one in essence rectangular strip of electroconductive material that is applied during the manufacturing of an integrated circuit in a manner customary in IC technology and provides that at least two parts of the integrated circuit are interconnected electroconductively. A data port, such as the first processor data port 104 shown in FIG. 1, second processor data port 105, first external data port 107 and second external data port 108, is the place where a part of an integrated circuit, for example a processor 103, makes electroconductive contact with a connection.

A connection is also understood to mean an assembly of a plurality of connections as described above, which are interconnected electroconductively in a manner customary in IC technology. In the embodiment shown in FIG. 1 the connections are intended for parallel data transmission which data comprise a plurality of bits and each of the connections shown as such therefore comprises a plurality of adjacent strips as described above which each individually make electroconductive contact with the same data ports. Integrated circuits, which are identical at functional level, may show great mutual differences at layout level, because library cells are positioned essentially different relative to each other. This results in connections that are made in an essentially different manner.

A problem for designing at layout level is the mutual positioning of the processors 103. The mutual positioning has a great influence on the routing of the connections between the first or second processor data port 104, 105 respectively and the first or second external data port 107 and 108 respectively. This problem occurs all the more because it is generally only possible that (parts of) connections mutually form 45 or 90-degree angles or multiples thereof. As a result of the parallelism in the data processing, many connections are necessary. They therefore largely determine the surface area that the integrated circuit needs to have on silicon.

According to the invention the processors 103 are positioned relative to each other in a manner that results in a minimum surface area. The straight first and second connections 109, 110 shown in FIG. 1 are the shortest possible connections between the first and second processor data ports 104, 105 respectively and the first and second external data ports 107, 108 respectively. A shortest possible connection is also the connection that takes up the smallest surface area. This thus achieves a saving on surface area. A further advantage is that the first and second connections 109, 110 cannot only be positioned essentially straight but also as close together as possible, so that a further required saving on surface area required is achieved.

In lieu of choosing for an integrated circuit with a smaller surface area, there may also be selected to provide more functionality on the same silicon surface area by increasing the functionality of the individual processors 103. This offers potential to realize more advanced image processing algorithms on the same surface area.

It will be evident that the principle defined above does not only lend itself to being applied to integrated circuits, but that it also lends itself to being applied to printed circuit boards (PCBs) where the processors 103 are positioned as individual integrated circuits on the PCB and the first or second connections 109, 110 respectively are formed by the electro-conductive tracks on the PCB.

FIG. 2 gives a diagrammatic representation of a further embodiment of the matrix of processors 200 of a parallel data processing device, a DSP according to the invention. In the processor matrix 200 the processors 203 are arranged in rows 201 and columns 202. The rows 201 are mutually arranged in a stepwise fashion. This means that each row 201 is shifted in the same direction and preferably over the same distance relative to the previous row 201. Also the columns 202 are mutually arranged in a stepwise fashion. So each column 202 is shifted in the same direction and preferably over the same distance relative to a previous column 202. The processors 203 have a first primary processor data port 204, a first secondary processor data port 205, a second secondary processor data port 206 and a second processor data port 207. Furthermore, the periphery, indicated by the rectangle 208, has first external data ports 209 and second external data ports 210. The external data ports are located outside the processor matrix 200. The external data ports are connection points or terminals for electro-conductive connections by which the processors 203 are connected with other electronic components which either form part of the DSP or are located outside the DSP.

The first primary processor data port 204 is connected by means of a first at least essentially straight connection 211 with the first secondary processor data port 205 of a second processor 203 and the second secondary processor data port 206 of a third data processor 203. At the same time the first primary processor data port 204 is connected via the same first connection 211 with one of the first external data ports 209. The second processor data port 207 is connected by means of a second at least essentially straight connection 212 to a second external data port 210. The second connection 212 is then positioned transversely to the first connection 211. It is possible for the first connection 211 and the second connection 212 to be designed straight, because the processors 203 are arranged in staggered fashion both in the direction of the rows and in the direction of the columns.

An advantage of this embodiment is that when the same data is to be sent to both the first processor data port 204 and to the first or second secondary data port 205, 206 respectively, on two other processors 203, only one first connection 211 is required to make this possible.

When data are processed coming from one image line it is often necessary for a processor 203 also to process data from another pixel in addition to the data of a pixel that enters through the first primary processor data port 204. The former data then comes in through the first secondary processor data port 205 or the second secondary processor data port 206. The embodiment shown in FIG. 2 is highly suitable for this purpose since the connections 211 can be straight as a result of the positioning of the processors 203 in the processor matrix 200.

The embodiment shown in FIG. 2 is pre-eminently suitable for processing data comprising sequences of data elements. The processors 203 then process one data element from the series of data elements that are supplied through the first external data ports 209. The first primary processor data port 204 then receives for example a data element N from a first external data port 209. The same processor 203 also receives on the first secondary processor data port 205 the data element preceding in the series, for example N−1, and on the second secondary processor data port 206 the data element succeeding in the series, for example N+1.

FIG. 3 gives a diagrammatic representation of a further embodiment of the processor matrix 300 of a device for parallel data processing, a DSP, according to the invention. In the processor matrix 300 the processors 303 are arranged in rows 301 and columns 302. The rows 301 and columns 302 respectively are mutually arranged in a stepwise fashion. The processors 303 have a first primary processor data port 304, a first secondary processor data port 305, a second secondary processor data port 306, a second primary processor data port 307, a third secondary processor data port 308 and a fourth secondary processor data port 309. Further, the periphery, represented by the rectangle 310, has first external data ports 311 and second external data ports 312. The external data ports 311, 312 are situated outside the processor matrix 300. The external data ports are connection points or terminals for electroconductive connections by which the processors 303 are connected with further electronic components, which either form part of the DSP or are situated outside the DSP.

The first primary processor data port 304 is connected by means of a first at least essentially straight connection 313 with the first secondary processor data port 305 of a second processor 303 and the second secondary processor data port 306 of a third processor. The first primary processor data port 304 is also connected by means of the same first connection 313 to one of the first external data ports 311. The second primary processor data port 307 is connected by means of a second at least essentially straight connection 314 with the third secondary processor data port 308 of another processor 303 and the fourth secondary processor data port 309 of yet another processor. At the same time the second primary processor data port 307 is connected by means of the same second connection 314 with one of the second external data ports 311.

An advantage of this embodiment is that it is for example suitable for processing data coming from a plurality of image lines. Data from a first image line is then applied to the processors 303 in the processor matrix 300 via the first external data ports 311 and the first connections 313. Data from a second image line is applied to the processors 303 via the second external data ports 312 and the second connection 314. Information belonging to the $N^{th}$ picture element from the two image lines is received by a processor 303 on the first and second primary processor data port 304, 307 respectively. Information of the elements (N−1) from the two image lines is received by the processor 303 on the first and third secondary processor data port 305, 308 respectively. Information from the elements (N+1) from the two image lines is received by the processor 303 on the second and fourth secondary processor data port 306, 309 respectively. Since the first and second connections 313 and 314 can supply the same data to various processors, the number of connections required is restricted. Since the first and second connections 313 and 314 are arranged essentially straight, surface area is saved.

FIG. 4 is a diagrammatic representation of the positioning of buffers in an embodiment of the device according to the invention. The processor matrix 400 shown may be one of the processor matrices 100, 200 or 300. The individual processors are not shown. Along the periphery of the processor matrix 400 which periphery is shown by the rectangle 401, the first external data ports 402 and the second external data ports 403 are shown. The first external data ports 401 are then in the neighborhood of the first or last row of processors in the processor matrix 400 and the second external data ports 402 in the neighborhood of the first or last column of processors in the processor matrix 400. Furthermore are shown a first data buffer 404 which has first buffer data ports 406, and a second data buffer 405 which has second buffer data ports 407.

A first at least essentially straight connection 410 connects one of the first external data ports 402 with at least one of the processor data ports on at least one of the processors in the processor matrix 400. A second at least essentially straight connection 411 connects one of the second external data ports 403 with at least one of the processor data ports on at least one of the processors in the processor matrix 400. The first connection may be one of the first connections 109, 211, or 313. The second connection may be one of the second connections 110, 212 or 314. The second connection 411 is oriented essentially transversely to the first connection 410. A third in essence straight connection 408 connects one of the first buffer data ports 406 with one of the first external data ports 402. The first connection 410 is a continuation of the third connection 406. A fourth in essence straight connection 409 connects either of the second buffer data ports 407 with either of the second external data ports 403. The second connection 411 is a continuation of the fourth connection 408.

Buffers are often necessary for storing data intermediately. As a result of the third and fourth connections 408, 409 being essentially straight as a continuation of the first and second connections 410 and 411 respectively, there has been provided that the least possible surface area is added to the DSP.

FIG. 5 gives a diagrammatic representation of the positioning of buffers in a further embodiment of the device according to the invention. The processor matrix 500 shown may be one of the processor matrices 100, 200 or 300. The individual processors are not shown. Along the periphery of the processor matrix 500 shown by the rectangle 501 are shown the first external data ports 506, 507 and the second external data ports 508 and 509. The first external data ports 506 are then located in the neighborhood of the first row of processors in the processor matrix 500 and the first external data ports 507 in the neighborhood of the last row of processors in the processor matrix 500. The second external data ports 508 are located in the neighborhood of the first column of processors in the processor matrix 500 and the second external data ports 509 in the neighborhood of the last column of processors in the processor matrix 500. Further are shown a first part 502 and a second part 503 of a data buffer which have first data ports 510, 511 and a first part 504 and a second part 505 of a second data buffer which have second buffer data ports 512, 513.

A first at least essentially straight connection 516 connects one of the first external data ports 506, 507 with at least one of the processor data ports on at least one of the processors in the processor matrix 500. A second at least essentially straight connection 517 connects either of the second data ports 508, 509 with at least one of the processor data ports on at least one of the processors in the processor matrix 500. The first connection may be one of the first connections 109, 211 or 313. The second connection may be one of the second connections 110, 212, 314. The second connection 517 is essentially oriented transversely to the first connection 516. A third essentially straight connection 514 connects one of the first buffer data ports 510 on the first part 502, or first buffer data ports 511 on the second part 503 of the first data buffer with one of the first external data ports 506 or 507 respectively. The third connection 514 is a continuation of the first connection 506. A fourth essentially straight connection 515 connects one of the second buffer data ports 512 on the first part 504 and first buffer data ports 513 on the second part 505 of the second data buffer with one of the second external data ports 508 and 509 respectively. The fourth connection 515 is a continuation of the second connection 517.

The splitting of the first data buffer shown in FIG. 5 into a first part 502 and a second part 503 and the splitting of the second data buffer into a first part 504 and a second part 505 is advantageous in that the first connections 516 and second connections 517 respectively can be placed closer together, so that a further saving on required surface area is achieved.

FIG. 6 gives a schematic representation of an embodiment of a camera system 600 according to the invention. The camera system 600 comprises a sensor matrix 601, means for converting pixel signals into data, the data converter 602, a device for parallel data processing DSP 603. The DSP 603 comprises a central controller 604 for coordinating tasks from the various parts and is for the rest equal to the DSP shown in FIG. 5. The whole camera system 600 is preferably realized in a CMOS technology in which all the parts are realized in a single integrated circuit. In an alternative embodiment the various parts are realized in at least two separate integrated circuits. An advantage of this is that the sensor matrix 601 can be realized both in CMOS and in CCD technology.

The sensor matrix 601 is formed by rows, the image lines and columns of light sensitive elements. With this structure incident light images are subdivided into pixels. The incident light images are converted per pixel into a pixel signal by the light-sensitive elements. The data converter 602 comprises at least one analog-to-digital converter (A/D converter). It is to be recommended to simultaneously convert pixel signals from one and the same image line to data. This requires a plurality of A/D converters, it is true, but the requirements for an individual A/D converter are less stringent, particularly as regards the speed of conversion. An arrow 605 indicates the path covered by the pixel signals from the sensor matrix 601 to the data converter 602.

From the data converter 602 the data is sent to the DSP 603. An arrow 606 shows the path covered by the data from the data converter 602 to the DSP 603 and further within the DSP 603. In the embodiment shown the data is distributed over the first part 502 and the second part 503 of the first data buffer. Once the data has been processed in the processors of the processor matrix 500 it is passed on to the first part 504 and the second part 505 of the second data buffer. From here the processed data is sent on. This is indicated by the arrow 607.

FIG. 7 gives a diagrammatic representation of the color film matrix 700 to be used in an embodiment of a camera system 600 according to the invention. When this color film matrix is laid over the sensor matrix, each light sensitive element receiving light of a specific color and thus becoming sensitive to this specific color. The pattern shown provides that each light sensitive element from the sensor matrix 601 becomes sensitive to one of the colors red 701, green 702 or blue 703. A row in the sensor matrix 601 thus contains information of two of said colors. The sensor matrix 601 is always read out row by row. The DSP 603 processes one color per processing operation. It is therefore advantageous to always process data coming from two adjacent columns in the sensor matrix 601. They always contain information of two different colors. If for example a VGA image comprising 480 rows of 640 pixels each is to be processed row by row, 320 processors are needed.

In an alternative embodiment of the camera system 600 color information from the adjacent pixels in a row together with adjacent pixels in a column are used to determine an interpolated color value.

In the examples discussed particularly embodiments of a camera system are discussed. It will be evident to a man of ordinary skill in the art that without departing from the scope of the invention the device for parallel data processing according to the invention lends itself to being used in many fields of application.

In this respect one may think of, for example, a device for parallel data processing comprising a plurality of identical processors, each in its own integrated circuit, in which the processors are arranged in a matrix on a PCB and the connection is formed by the conducting wiring patterns on the PCB.

The device for parallel data processing also lends itself to other applications than the image data processing in a line-by-line fashion. A similar device can be used in other applications in which series of data elements are processed in identical or substantially identical manner.

It is further possible to build up a DSP from a plurality of processor matrices. This is advantageous in that the processors in the various processor matrices simultaneously carry out different processes on the same data. Two processors lying each in a different processor matrix, but in corresponding positions in the processor matrix, are then supplied with the same data on their processor data ports. Another advantage is that results of processes of the processors in one processor matrix can be exchanged with the processors from another processor matrix. Alternatively, it is possible in a DSP built up from a plurality of processor matrices to mirror the processor matrices relative to one another. This may be advantageous for executing several processes.

The invention claimed is:

1. A device for parallel data processing, wherein the device has at least one matrix of processors arranged in rows and columns, first additional data ports located outside the matrix and second additional data ports located outside the matrix, wherein
   the rows are arranged in a stepwise fashion relative to one another,
   the columns are arranged in a stepwise fashion relative to one another,
   processors have a first processor data port which is connected with one of the first external data ports by means of a first at least straight connection,
   processors have a second processor data port which is connected with one of the second external data ports by means of a second at least essentially straight connection, wherein the second at least essentially straight connection is oriented at least essentially orthogonal to the first at least essentially straight connection, and
   processors have a first primary processor data port and a first secondary processor data port, wherein the first primary processor data port is formed by the first processor data port and the first primary processor data port of at least one of the processors is also connected with the first secondary processor data port of another processor via the first connection.

2. A device as claimed in claim 1, wherein the device has a first data buffer for data storage, the first data buffer having first buffer data ports, at least one of which is connected with one of the first external data ports by means of an at least essentially straight third connection that is a continuation of the first connection.

3. A device as claimed in claim 2, wherein the first data buffer is split up into two physically separated parts of which a first part is positioned dose to the first row of processors in the processor matrix and a second part is positioned close to the last row of processors in the processor matrix.

4. A device as claimed in claim 1, wherein the device has a second data buffer for data storage, the second data buffer having second buffer data ports, least one of which is connected with one of the second external data ports by means of a fourth at least essentially straight connection that is a continuation of the second connection.

5. A device as claimed in claim 4, wherein the second data buffer is split up into two physically separated parts of which a first part is positioned dose to the first column of processors in the processor matrix and a second part is positioned close to the last column of processors in the processor matrix.

6. A device as claimed in claim 1, wherein the first primary processor data port and the first secondary processor data port of processors are arranged for receiving data from one of the first external data ports.

7. A device as claimed in claim 6, wherein the processors are arranged for processing a series of data elements, in which processors are arranged for processing at least one data element from the series of data elements.

8. A device as claimed in claim 7, wherein processors have a second secondary processor data port, in which the primary processor data port is connected for receiving a data element to be processed from the series of data elements from one of the first external data ports and is connected with the second secondary processor data port of the processor that processes the dement preceding the data element in the series of data elements and is also connected with the first secondary processor data port of the processor that processes the data element succeeding the data element in the series of data elements.

9. A device as claimed in claim 1, wherein processors have a second primary processor data port and a third secondary processor data port, the second primary processor data port being formed by the second processor data port, the second primary processor data port of at least one of the processors also being connected with the third secondary processor data port of another processor via the second connection.

10. A device as claimed in claim 9, wherein the second primary processor data port and the third secondary processor data port is arranged for receiving data from one of the second external data ports.

11. A camera system comprising a sensor matrix built up from rows and columns for converting incident electromagnetic radiation into pixel signals, means for converting pixel signals into data and a device comprising processors for parallel data processing as claimed in one of the claims 1.

12. A camera system as claimed in claim 11, wherein the sensor matrix has a color filter matrix and wherein processors are arranged for processing data from a plurality of elements of the sensor matrix, which data contains color information of various colors of the color filter matrix.

* * * * *